(12) United States Patent
Teuber

(10) Patent No.: US 6,629,596 B2
(45) Date of Patent: Oct. 7, 2003

(54) CONVEYOR CHAIN

(75) Inventor: Toralf Teuber, Neufahrn (DE)

(73) Assignee: Joh. Winklhofer & Soehne GmbH und Co. KG, Munich (DE)

( * ) Notice: Subject to any disclaimer, the term of this patent is extended or adjusted under 35 U.S.C. 154(b) by 0 days.

(21) Appl. No.: 10/122,831

(22) Filed: Apr. 15, 2002

(65) Prior Publication Data

US 2003/0006124 A1 Jan. 9, 2003

(30) Foreign Application Priority Data

Apr. 20, 2001 (DE) .......................... 101 19 437

(51) Int. Cl.⁷ ............................................... B65G 17/06
(52) U.S. Cl. ..................................... 198/850; 198/496
(58) Field of Search .......................... 198/493, 496, 198/850, 851, 852, 853

(56) References Cited

U.S. PATENT DOCUMENTS

| | | | | |
|---|---|---|---|---|
| 932,981 A | * | 8/1909 | Goff | 198/496 |
| 4,126,219 A | * | 11/1978 | Bross | 198/850 X |
| 4,766,997 A | * | 8/1988 | Hannum | 198/853 |
| 4,932,515 A | * | 6/1990 | Stohr | 198/853 X |

* cited by examiner

*Primary Examiner*—James R. Bidwell
(74) *Attorney, Agent, or Firm*—Armstrong, Westerman & Hattori, LLP

(57) ABSTRACT

The present invention relates to a conveyor chain comprising inner chain links and outer chain links which are arranged in alternating succession and which are interconnected by respective chain hinges, a chain hinge comprising a sleeve of the inner chain link and a pin forming part of the outer chain link and extending through the sleeve. The functionality of such a conveyor chain is to be extended. For this purpose, at least one brush element is provided, which comprises at least one fastening reception, and the brush element is attached via the fastening reception to the inner and/or outer chain link(s) such that it is essentially in positive engagement therewith. The present invention also relates to a brush element for a conveyor chain of the type in question.

13 Claims, 4 Drawing Sheets

CONVEYOR CHAIN

Figure 1:
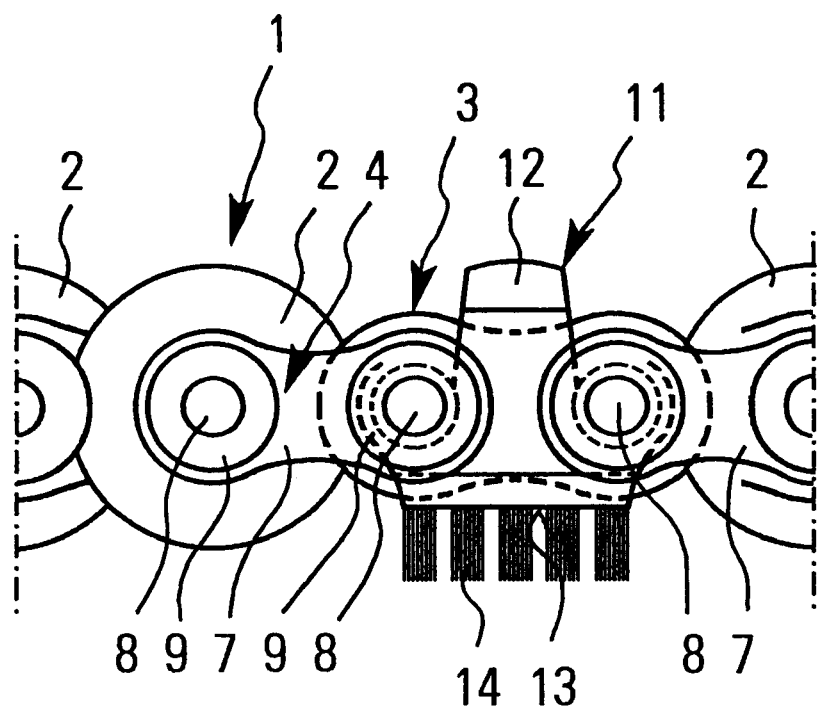

The present invention relates to a conveyor chain comprising inner chain links and outer chain links which are arranged in alternating succession and which are interconnected by respective chain hinges, a chain hinge comprising a sleeve of the inner chain link and a pin forming part of the outer chain link and extending through the sleeve.

The prior art comprises a plurality of conveyor chains having the above-described structural design. One of these types of conveyor chains is the accumulation conveyor chain. An accumulation conveyor chain comprises, on the one hand, running rollers provided for the purpose of guiding and for engagement with the chain-drive sprockets, and, on the other hand, accumulation rolls which are used as load-carrying rolls and which, in the case of accumulation, guarantee rolling contact with the objects to be transported. There are simple accumulation conveyor chains in the case of which the outer chain link comprises two parallel outer link plates and two pins interconnecting said outer link plates, and the inner chain link comprises two parallel inner link plates and two sleeves interconnecting said inner link plates. Normally, every second sleeve has provided thereon an accumulation roll, which is arranged such that it is freely rotatable. In order to achieve a higher degree of overlap of the accumulation rolls, there is also one variant where the inner chain link is composed of two sleeves and a central link plate which is arranged centrally relative thereto. This variant uses narrower accumulation rolls which are located on the right-hand side of the central link plate in the case of the first sleeve and on the left-hand side of the central link plate in the case of the next sleeve so that the accumulation rolls alternate in a zigzag mode and so that a partially overlapping arrangement is provided. Also in the case of this variant only every second sleeve of one row has arranged thereon an accumulation roll. The use of such conveyor chains is widespread. The chains are normally guided in a special rail system, which can also be used for side bow guidance in connection with special accumulation conveyor chains. In such arrangements problems may sometimes be caused by dust particles penetrating into the rail system. In connection with some types of chains it is already known to provide covers by means of which certain areas of the chain are covered in such a way that an ingress of dust particles is prevented.

It is now the object of the present invention to provide an improved conveyor chain having improved wear properties.

In accordance with the present invention, this object is achieved by the features that at least one brush element is provided, which comprises at least one fastening reception means, and that said brush element is attached via the fastening reception means to an inner chain link and/or an outer chain link such that it is essentially in positive engagement therewith.

By means of this measure, the conveyor chain is provided with an active cleaning function, i.e. it is not only attempted to prevent an ingress of chips by means of a cover, but dirt particles are also actively removed from the chain guiding area. Such brush elements need not be arranged over the entire length of the chain, but it will suffice to position individual brush elements in such a way that the necessary cleaning function is guaranteed. Due to the fact that the fastening reception means is implemented as a push-on reception means (clip-on reception means), standard chains can also be equipped subsequently with this kind of brush elements.

An advantageous embodiment is an embodiment in the case of which the brush element is attached via the fastening reception means to a peripheral area of at least one sleeve of the inner chain link such that it is essentially in positive engagement therewith. This structural design will provide stable fastening.

In accordance with an advantageous embodiment, the brush element may comprises a plastic base member including said at least one fastening reception means, and bristles which are fixedly anchored in said plastic base member. Such plastic base members can be adapted very easily to a great variety of circumstances. Also the areas in which the bristles are anchored can be implemented in different ways. The bristles may, for example, be arranged in oblique, X, parallel and other modes of arrangement. Also the use of different materials and of different geometries of the bristles is imaginable.

In addition, the fastening reception means may be defined by a hole formed in said plastic base member and encompassing the sleeve of the inner chain link in positive engagement therewith. This will normally necessitate that the brush element is already pushed onto the sleeves when the chain is being mounted. A very tightly fitting and firm connection, which can only be released by destruction, is obtained in this way.

It is, however also possible that the fastening reception means comprises a detent means which is in elastic, locking engagement with the sleeve of the inner chain link. Hence, the brush element can be lockingly engaged with various portions of the chain. On the basis of this releasable mode of arrangement, an exchange is possible at any time. Such brush elements can, in principle, be lockingly engaged with the conveyor chain at any suitable location of the conveyor chain.

According to one embodiment, the detent means can be defined by a detent groove provided with a resilient boundary area on at least one side thereof, the detent groove encompassing the sleeve of the inner chain link over an angular area of more than 180°. A detent groove of this type will guarantee a tilt-proof arrangement e.g. over the whole length of the sleeve. When an appropriate material is chosen for the brush elements, suitable locking forces will be obtained when the chain is in operation so that the brush element cannot become detached inadvertently.

In addition, the brush element may comprise a pair of fastening reception means, the brush element may be arranged as a bridging unit between the two sleeves of an inner chain link, and each fastening reception means of the pair of fastening reception means may be attached to one of the sleeves of the inner chain link. This double attachment of the brush element provides reliable guidance and the best possible fixing of the brush element to the other elements of the chain. Furthermore, the gap between two sleeves is closed so that, in addition to the cleaning function of the bristles, also a cover function for covering this gap is fulfilled.

The conveyor chain can be implemented as an accumulation conveyor chain including accumulation rolls which are arranged on sleeves of the inner chain links, some accumulation rolls being replaced by brush elements. The brush elements are arranged such that a high load-carrying capacity of the accumulation rolls is still given, as far as possible, and that only individual accumulation rolls are replaced by brush elements. The number of brush elements depends on the cleaning function which is to be achieved.

In accordance with an advantageous embodiment, at least the bristles of the brush elements may project beyond the accumulation rolls in certain areas, when the conveyor chain is in operation. This will guarantee that a guide rail is swept clean. Due to the fact that the bristles project beyond the accumulation rolls, also the contact force with which the bristles are pressed onto a surface to be cleaned can be adjusted.

In addition, the inner chain link may comprise two sleeves and a centrally pressed-on central link plate interconnecting these two sleeves, and the outer chain link may comprise two pins and two outer link plates which are arranged in parallel and which interconnect these pins, a brush element being arranged in the space between an outer link plate and the central link plate. This embodiment of a conveyor chain permits the use of very narrow brush elements because said brush elements are arranged only in the space between the central link plate of the inner chain link and an outer link plate of the outer chain link.

A further embodiment is so conceived that two brush elements are implemented such that they form a structural unit with a central slot and that the central link plate is accommodated in said central slot. It follows that the brush unit implemented in this way covers the central link plate at the lower end thereof. It is also possible to use the central link plate for further fixing.

In accordance with a preferred embodiment, the pins of the outer chain links may project laterally and a running roller may be arranged on each of these projecting end portions. The actual guiding function of the conveyor chain is then executed via these running rollers. The spaces between the running rollers are normally also engaged by the driving sprockets so that the central area of the chain is reserved to the accumulation rolls and the brush elements.

In addition, the present invention may relate to a brush element for a conveyor chain according to one of the claims 1 to 12, said brush element comprising at least one fastening reception means which is adapted to be pushed onto at least one sleeve of an inner chain link of the conveyor chain.

Figure 4:
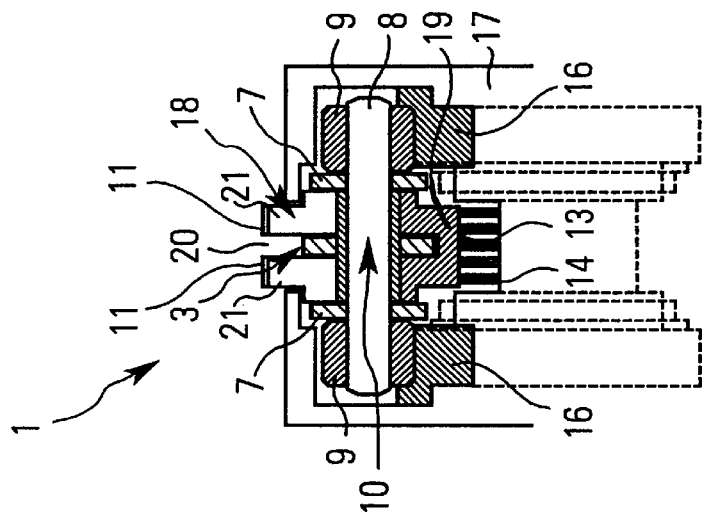
Figure 3:
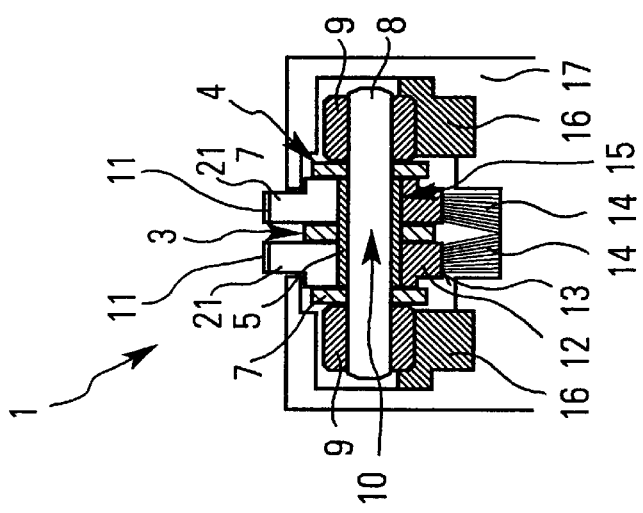
Figure 2:
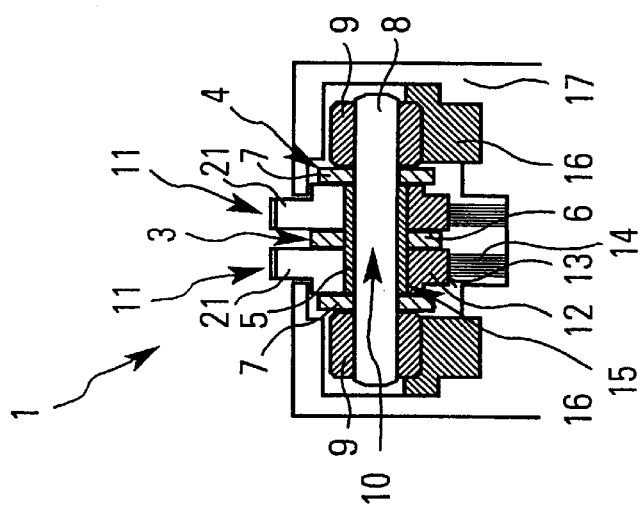
Figure 8:
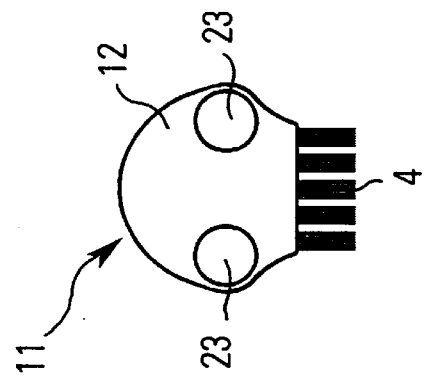
Figure 7:
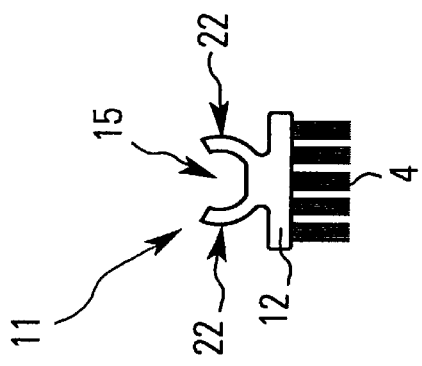
Figure 6:
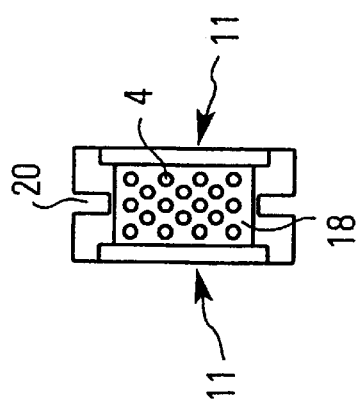
Figure 5:
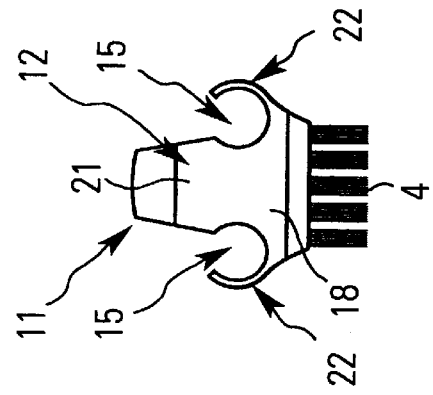
Figure 10:
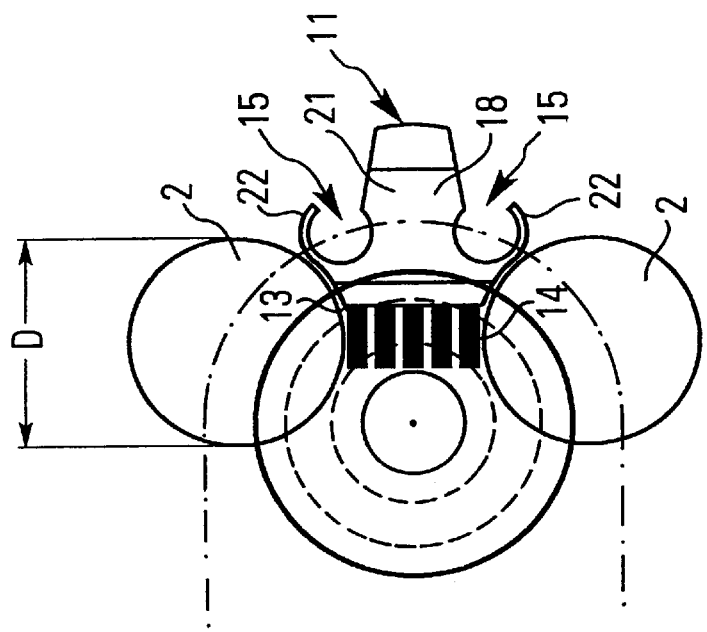
Figure 9:
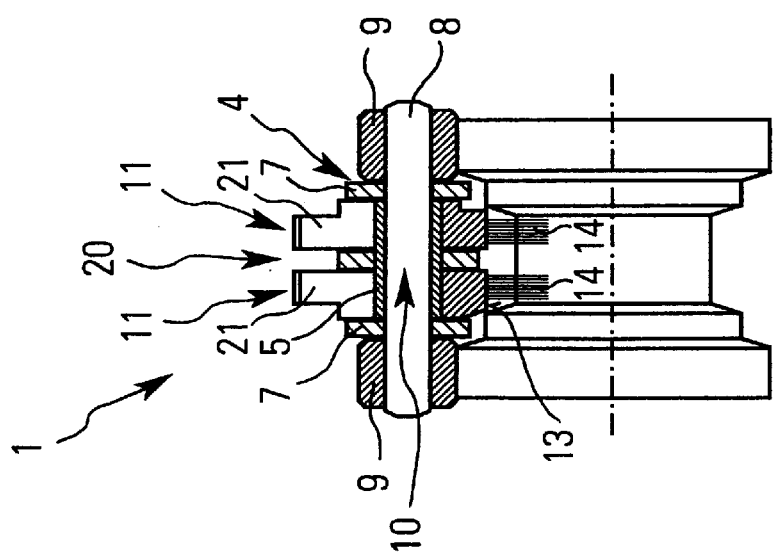

In the following, embodiments of the present invention will be explained in detail making reference to a drawing, in which:

FIG. 1 shows a side view of a detail of an accumulation conveyor chain with brush elements, FIG. 2 shows a cross-sectional view of an accumulation conveyor chain provided with a first variant of a brush element, FIG. 3 shows a cross-sectional view of an accumulation conveyor chain provided with a second variant of a brush element, FIG. 4 shows a cross-sectional view of an accumulation conveyor chain provided with a third variant of a brush element, FIG. 5 shows a side view of a brush element according to FIG. 4, FIG. 6 shows the brush elements according to FIG. 5 in a bottom view, FIG. 7 shows a side view of a fourth variant of a brush element, FIG. 8 shows a side view of a fifth variant of a brush element, FIG. 9 shows the brush element according to FIG. 2 during its movement around a deflection pulley, FIG. 10 shows a schematic side view in which it can be seen clearly how the accumulation conveyor chain according to FIG. 1 moves around a chain-drive sprocket.

FIG. 1 shows an accumulation conveyor chain (power and free conveyor chain) 1 comprising accumulation rolls 2 in an overlapping or zigzag arrangement. The accumulation conveyor chain 1 is composed of inner chain links 3 and outer chain links 4 which are arranged in alternating succession. Each inner chain link 3 comprises two sleeves 5 which are arranged parallel to one another and which are spaced apart by a centrally pressed-on central link plate 6. The outer chain links 4 comprise two parallel outer link plates 7, two parallel, spaced pins 8 pressed into said outer link plates 7, and four running rollers 9, each of said running rollers 9 being rotatably arranged on a respective end portion of the pins 8 projecting beyond the outer link plate 7. The ends of the pins 8. are riveted so that the running roller is held between the outer surface of the outer link plate 7 and the head of the rivet. Each chain hinge 10 is therefore defined by a pin 8 of an outer chain link 4 and a sleeve 5 of the inner chain link 3 through which the pin 8 extends.

The accumulation rolls 2 are each rotatably arranged on an external surface area of the sleeve 5. The width of the respective accumulation rolls 2 is dimensioned such that it is located between the central link plate 6 and the inner surface of the outer link plate 7. Since the accumulation rolls 2 are arranged such that they are located alternately on the right-hand side and on the left-hand side (from one sleeve to the next) of the central link plate 6, said accumulation rolls 2 are arranged in a partially overlapping mode. Within one row only every second sleeve 5 has an accumulation roll 2 arranged thereon.

One or several accumulation roll(s) 2 is/are replaced by a brush element or brush elements 11 over the length of the accumulation conveyor chain 1 randomly or at certain intervals. The brush element shown in FIGS. 1 and 2 has essentially the same width as an accumulation roll 2; hence, a sleeve 5 has arranged thereon one of these brush elements 11 on the left-hand side as well as on the right-hand side of the central link plate 6 at the respective location intended for said brush elements (cf. especially FIG. 2). The brush element 11 comprises a base member 12 made of plastic material and having bristles 14 anchored therein in the lower end face 13. The brush elements 11 are lockingly attached to external surface areas of the sleeves 5 and are provided with fastening reception means 15 for this purpose.

In FIG. 2 it can also be seen that the running rollers 9 run on guide rails 16 belonging to a channel-type guide means 17 which is shown in outlines. The bottom of the channel-type guide means 17 is kept clean by means of the bristles 14 of the brush element 11. Chips, dust and similar foreign particles are essentially prevented from collecting in this area. Moreover, the plastic base member 12 produces an additional covering effect by closing the gap between two sleeves 5. For this purpose, the brush element 11 is provided with two fastening reception means 15 so that it can be pushed onto both sleeves 5 of an inner chain link 3.

Another embodiment is shown on the basis of FIG. 3. The only difference between this embodiment and the embodiment according to FIG. 2 is that the bristles 14 on the lower end face 13 are oriented in a different way so that a larger area of the channel-type guide means 17 can be kept clean by them. The structural design of all the other components corresponds to that of FIG. 2; hence, reference is made to the above description.

On the basis of FIGS. 4, 5 and 6, a further variant of the brush element 11 is now described. Since it is again only the brush element 11 which differs from the above-described structural design, reference is again made to the above description with respect to the rest of the structural design of the accumulation conveyor chain 1.

In this embodiment, two brush elements 11 are combined so as to form a brush unit 18. For this purpose, a connecting web 19 is provided in the lower area. This connecting web 19 also serves to attach bristles 14 thereto, so that bristles can be arranged over the whole width of the lower end face 13 enlarged by said connecting web 19. The central link plate 6 is therefore covered at the lower end thereof by the connecting web 19. The brush unit 18 is provided with a slot 20 for this purpose, the central link plate 6 being arranged in said slot 20.

Reference should be made to the fact that the side view shown in FIG. 5 could also be the side view of the embodiment according to FIGS. 2 and 3; hence, comments made with respect to this embodiment are also applicable to the embodiment according to FIG. 5.

In FIG. 5, it can be seen that the plastic base member 12 is provided with a central neck area 21 which extends upwards between two sleeves 5 of the inner chain link 3. The groove-shaped fastening reception means 15 are located at the sides of this neck 21. The fastening reception means 15 have an inner surface whose shape corresponds to that of the circumferential surface of a cylinder and they are open at the upper end thereof. They, however, enclose an angular area of 180° so that they can encompass the sleeves 5. The outer boundary area 22 of these fastening reception means 15 is elastic so that the fastening reception means 15 can lockingly be engaged with the outer surfaces of the sleeves 5 whose shape corresponds to that of the circumferential surface of a cylinder. Accordingly, the centre-to-centre distance of the fastening reception means 15 is adapted to the centre-to-centre distance of the sleeves. In FIG. 5 it can also be seen that the fastening reception means 15 merge with the neck 21 with a slight undercut, whereby the holding function will be enhanced. The distance from the centre line of the fastening reception means 15 to the free ends of the bristles 14 is, in total, larger than the radius of the accumulation rolls 2 of the associated accumulation conveyor chain 1.

In FIG. 7 another variant can be seen. This variant is adapted to be attached to a single sleeve 5. The single fastening reception means 15 is implemented as a reinforced component and encloses also an angular area of >180° so that locking engagement with a sleeve 5 can take place. Essentially, the groove-shaped fastening reception means 15 is again provided with an inner surface whose shape corresponds to that of the circumferential surface of a cylinder. In the present case, both boundary areas 22 are elastic.

FIG. 8 shows an embodiment in the case of which a comparatively large plastic base member 12 is provided. This plastic base member 12 is equipped with openings 23 which serve as a fastening reception means 15. In the case of this variant, mounting of the brush element 11 must already take place when the chain is being mounted. All the other embodiments can also be incorporated subsequently, provided that an accumulation roll 2 has been omitted. Also in the case of the embodiments according to FIGS. 7 and 8, two brush elements 11 can be combined so as to form one brush unit 18; this kind of brush unit can clearly be seen from the embodiment according to FIGS. 4 to 6.

Making reference to FIGS. 9 and 10, it is now shown how the accumulation conveyor chain I is guided round a deflection pulley. In order to make things clearer, a deflection pulley having the smallest possible diameter has been chosen. From FIG. 10 it can be seen that the outer contour of the brush element 11 is chosen such that the brush element 11 is arranged optimally between two accumulation rolls 2 of one row. For this purpose, the lower end face 13 merges with the boundary area 22 of the fastening reception means 15 by means of a radius which is adapted to the diameter D of the accumulation rolls 2. The bristles extend over a length corresponding essentially to the distance between these two accumulation rolls 2 during the deflection process.

In the case of the brush elements 11 which are in locking engagement with the sleeves, the upwardly projecting neck 21 of the plastic base member 12 can be used for forcing out and disengaging, respectively, the attached brush element 11. Hence, an exchange of the brush element in the case of wear or a replacement of the brush element by a different type of brush element can be carried out at any time.

What is claimed is:

1. A conveyor chain comprising inner chain links (3) and outer chain links (4) which are arranged in alternating succession and which are interconnected by respective chain hinges (10), a chain hinge (10) comprising a sleeve (5) of the inner chain link (3) and a pin (8) forming part of the outer chain link (4) and extending through the sleeve (5), characterized in that at least one brush element (11) is provided, which comprises at least one fastening reception means (15), and that said brush element is attached via the fastening reception means (15) to an inner chain link and/or an outer chain link such that it is essentially in positive engagement therewith.

2. A conveyor chain according to claim 1, characterized in that the brush element (11) is attached via the fastening reception means (15) to a peripheral area of at least one sleeve (5) of the inner chain link (3) such that it is essentially in positive engagement therewith.

3. A conveyor chain according to claim 1 or 2, characterized in that the brush element (11) comprises a plastic base member (12) including said at least one fastening reception means (15), and bristles (14) which are fixedly anchored in said plastic base member (12).

4. A conveyor chain according to claim 1 or 2, characterized in that the fastening reception means (15) is defined by a hole (23) formed in said plastic base member (12) and encompassing the sleeve (5) of the inner chain link (3) in positive engagement therewith.

5. A conveyor chain according to claim 1 or 2, characterized in that the fastening reception means (15) comprises a detent means which is in elastic, locking engagement with a sleeve (5) of the inner chain link (3).

6. A conveyor chain according to claim 5, characterized in that the detent means is defined by a detent groove provided with a resilient boundary area (22) on at least one side thereof, and that the detent groove encompasses the sleeve (5) of the inner chain link (3) over an angular area of more than 180°.

7. A conveyor chain according to claim 1 or 2, characterized in that the brush element (11) comprises a pair of fastening reception means, that the brush element (11) is arranged as a bridging unit between the two sleeves (5) of an inner chain link (3), and that each fastening reception means (15) of the pair of fastening reception means is attached to one of the sleeves (5) of the inner chain link (3).

8. A conveyor chain according to claim 1 or 2, which is implemented as an accumulation conveyor chain including accumulation rolls (2) which are arranged on sleeves (5) of the inner chain links (3), characterized in that at least one accumulation roll (2) is replaced by a brush element (11).

9. A conveyor chain according to claim 8, characterized in that at least the bristles (14) of the brush elements (11) project beyond the accumulation rolls (2) in certain areas when the conveyor chain is in operation.

10. A conveyor chain according to claim 1 or 2, characterized in that the inner chain link (3) comprises two sleeves (5) and a centrally pressed-on central link plate (6) interconnecting these two sleeves, and that the outer chain link (4) comprises two pins (8) and two outer link plates (7) which are arranged in parallel and which interconnect these pins (8), and that a brush element (11) is arranged in the space between an outer link plate (7) and the central link plate (6).

11. A conveyor chain according to claim 10, characterized in that two brush elements (11) are implemented such that they form a structural unit (18) with a central slot (20) and that the central link plate (6) is accommodated in said central slot (20).

12. A conveyor chain according claim 8, characterized in that the pins (8) of the outer chain links (4) project laterally and that a running roller (9) is arranged on each of these projecting end portions.

13. A brush element (11) for a conveyor chain according to claim 1 or 2, said brush element (11) comprising at least one fastening reception means (15) which is implemented such that it is adapted to be pushed onto an inner chain link and/or an outer chain link.

\* \* \* \* \*